(12) United States Patent
Ribi

(10) Patent No.: US 7,222,470 B2
(45) Date of Patent: May 29, 2007

(54) PROCESSES FOR CAUSING AN EXTENSIBLE POLYMER FILM TO ADHERE TO THE EDGE OF THE OPENING OF A BOTTLE OR SIMILAR CONTAINER MADE OF PLASTIC (PET OR THE LIKE) OR METAL AND VARIOUS DEVICES FOR IMPLEMENTING SAID PROCESSES

(75) Inventor: Guido Ribi, Montreux (CH)

(73) Assignee: Ribi Pack S.p.A., Genoa (IT)

( * ) Notice: Subject to any disclaimer, the term of this patent is extended or adjusted under 35 U.S.C. 154(b) by 68 days.

(21) Appl. No.: 10/480,305

(22) PCT Filed: Jun. 11, 2002

(86) PCT No.: PCT/IB02/02132

§ 371 (c)(1),
(2), (4) Date: Feb. 17, 2004

(87) PCT Pub. No.: WO02/100762

PCT Pub. Date: Dec. 19, 2002

(65) Prior Publication Data

US 2004/0168402 A1 Sep. 2, 2004

(30) Foreign Application Priority Data

Jun. 13, 2001 (CH) .................................... 1059/01

(51) Int. Cl.
*B65B 61/00* (2006.01)
*B65B 7/28* (2006.01)
*B67B 3/00* (2006.01)

(52) U.S. Cl. .................... 53/141; 53/290; 53/329.3
(58) Field of Classification Search ................ 53/478, 53/485, 486, 487, 141, 289, 290, 329.3, 432, 53/291, 94, DIG. 2
See application file for complete search history.

(56) References Cited

U.S. PATENT DOCUMENTS

| 2,173,803 | A | * | 9/1939  | Gammeter ............... 53/290 |
| 2,422,750 | A | * | 6/1947  | Rue |
| 2,516,278 | A | * | 7/1950  | Vore ..................... 53/290 |
| 2,542,702 | A | * | 2/1951  | Prow |
| 2,608,334 | A | * | 8/1952  | Knocke |
| 2,920,431 | A | * | 1/1960  | Izumi |
| 3,407,436 | A | * | 10/1968 | Anderson et al. |
| 3,462,909 | A | * | 8/1969  | Anderson |
| 3,660,549 | A | * | 5/1972  | Hawkins ............... 264/467 |
| 3,992,850 | A | * | 11/1976 | Vetter ................... 53/510 |
| 4,009,552 | A | * | 3/1977  | Schlachter ............ 53/510 |
| 4,680,163 | A | * | 7/1987  | Blidschun et al. ...... 422/28 |

(Continued)

FOREIGN PATENT DOCUMENTS

WO    WO 9832668 A2 *    7/1998

(Continued)

*Primary Examiner*—Stephen F. Gerrity
(74) *Attorney, Agent, or Firm*—James Creighton Wray

(57) ABSTRACT

Various processes and relevant devices for causing polymer films, which are extensible to adhere to the edges of openings of plastic or PET or even metal containers, by releasing electrostatic charges opposite in sign to those of containers and/or the polymer films to be applied thereto. The processes derive from a single general inventive concept.

25 Claims, 3 Drawing Sheets

U.S. PATENT DOCUMENTS

| | | | | |
|---|---|---|---|---|
| 4,707,334 A | * | 11/1987 | Gerhard | 422/28 |
| 4,896,479 A | * | 1/1990 | Gannon | 53/432 |
| 5,199,246 A | * | 4/1993 | Rodrigo | 53/449 |
| 5,271,207 A | * | 12/1993 | Epstein et al. | 53/432 |
| 5,305,583 A | * | 4/1994 | Linner | 53/478 |
| 5,323,589 A | * | 6/1994 | Linner | 53/432 |
| 5,718,101 A | * | 2/1998 | Noel et al. | 53/432 |
| 5,749,203 A | * | 5/1998 | McGowan, Jr. | 53/432 |
| 5,884,455 A | * | 3/1999 | Draghetti et al. | 53/466 |
| 6,748,726 B2 | * | 6/2004 | Rossi et al. | 53/510 |

FOREIGN PATENT DOCUMENTS

WO    WO 99/17990 A1 * 4/1999

* cited by examiner

PROCESSES FOR CAUSING AN EXTENSIBLE POLYMER FILM TO ADHERE TO THE EDGE OF THE OPENING OF A BOTTLE OR SIMILAR CONTAINER MADE OF PLASTIC (PET OR THE LIKE) OR METAL AND VARIOUS DEVICES FOR IMPLEMENTING SAID PROCESSES

This application claims the benefit of Swiss Application No. 1059/01 filed Jun. 13, 2001 and PCT/IB02/02132 filed Jun. 11, 2002.

BACKGROUND OF THE INVENTION

1. Field of the Invention

The invention relates to the field of container closures and particularly of liquid and food container sealing. It addresses two processes to condition both the edge of the opening of the plastic or metal container and the extensible polymer film to be applied thereto with the process disclosed in Patent Application Ribi WO 98/32668 of Jan. 23, 1998.

Thanks to such conditioning, performed with various devices allowing to perform the processes, an effective and safe sealing effect is obtained.

2. Related Art

In prior art sealing techniques, liquid and/or food containers are typically sealed either by means of bonded screw plugs or metal plugs, or by the application of various metal disks, to be attached to the edge of the opening, or with blind seals, which are held in position by other mechanical devices, like those mentioned above.

A more practical, cost-effective, hence industrially advantageous arrangement is proposed by the invention disclosed in Patent Application WO 98/32688 of Jan. 23, 1998, and various implementations thereof, i.e. devices for applying extensible polymer films to the edges of the openings of glass containers.

Nevertheless, this arrangement cannot be used for plastic or metal containers because, as explained below, adhesion thereof is hindered by the electrostatic charges of equal polarity on the faces of the two materials to be attached or simply due to the lack of electric charges on said faces.

SUMMARY OF THE INVENTION

The processes which form the subject of this invention and the devices used for implementation thereof allow two plastic surfaces, or plastic and metal surfaces, to effectively adhere to each other, thereby assisting the application of an extensible polymer film to the opening of a plastic or metal container.

The invention essentially consists in charging electrostatically the adhering surfaces in opposite polarity and in possibly improving said adhesion by heating the two surfaces.

The tight adhesion of extensible plastic seals on plastic or metal materials not only depends on the surface condition, but also on temperature, which allows a better mutual adaptation of the two materials in contact with each other during the application. Nevertheless, as shown in various tests and specific measurements, film adhesion is mostly affected by the presence of opposite electrostatic charges on the opposed faces of the materials to be attached.

Typically, in normal conditions, the charges on the two materials, i.e. plastic-plastic or plastic-metal, unlike glass-plastic, have the same polarity (or are absent), hence the surfaces tend to remain separate when attempting to join them.

The processes of this invention, and the devices used to implement them, consist in assigning electrostatic charges of opposite polarity to the two adhering materials.

This simple arrangement allows even a relatively weak force, like electrostatic force, to be effective in assisting the adhesion of the deformable extensible plastic material to the edge of the container opening, so that the two boundary air layers adjacent to the two materials are removed thereby allowing atmospheric pressure to exert its full force.

DETAILED DESCRIPTION OF THE INVENTION

Figures 1A, 1B:
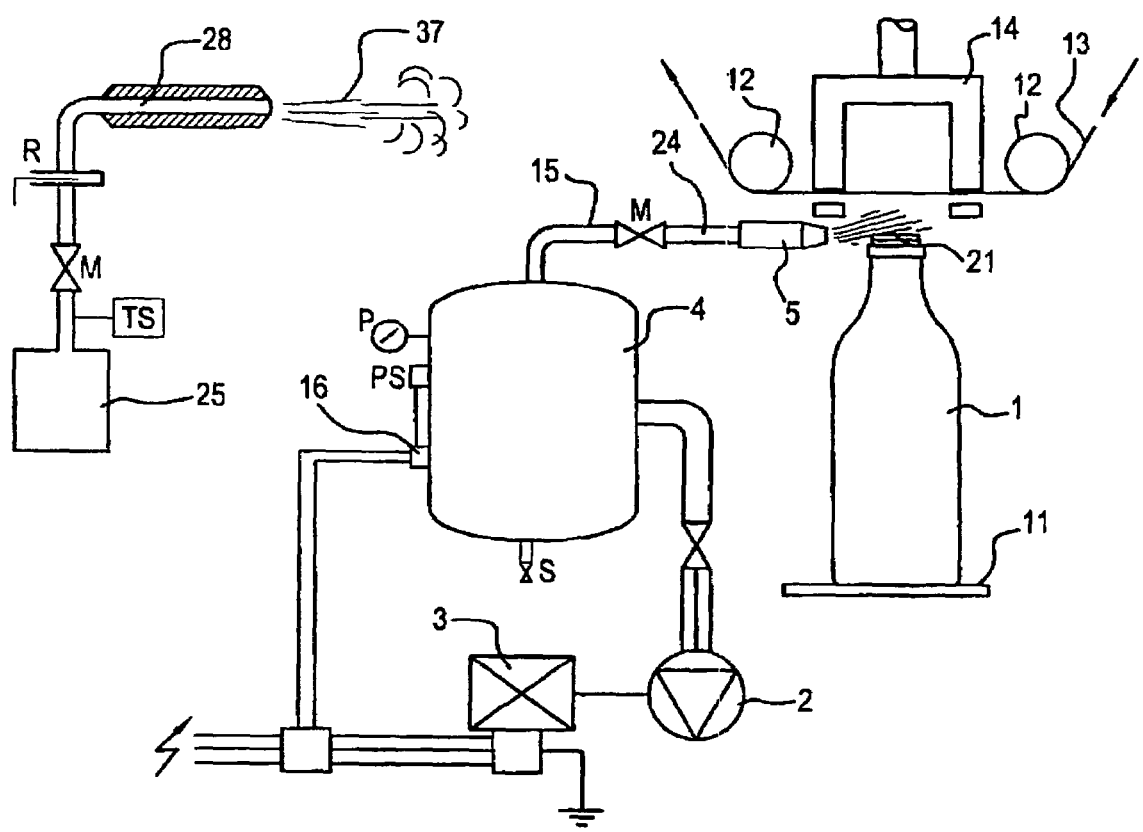
FIGS. 1a and 1b show the device in its simplest configuration for implementing the process adhering two surfaces.

The process consists in directing a flow 24, or continuous or discontinuous jet of air or any appropriate dry gas on the edge of the opening 21 of the container 1 to be sealed.

This flow 24 is generated by any suitable compressed air or gas source, e.g. a compressor, or even directly by heating or changing the state of a suitable liquid or solid. Obviously, this process is conceived for and operates on any suitable surface composing the edge 21 of the container to be sealed, either painted, anodized, frosted or passivated.

The typical device for the implementation of said basic process, as shown in FIG. 1 is described below.

In order to improve the efficiency of the process, the molecules composing the flow 24 are charged electrostatically by using an electrostatic charge generator 8 equal or equipollent to the so-called Van der Graaf type, with or without capacitors 9, to increase the available charges. Then, these charges are directly released to the molecules of the flow 24, by simple contact in the feed pipe 15.

So, the plates 7 of the same sign may be licked by the flow 24 thereby suitably charging it.

Various capacitors may be used, either simply consisting of two plates 7 with an interposed dielectric 19, i.e. the air or gas itself, or formed by combinations of various plates with other interposed dielectrics 19. The plates 7 may also be made of porous materials to extend the surface thereof, such as activated carbon, which may be also used with suitable fluid dielectrics 19.

The devices for implementing the above mentioned variants of the process, are described below.

The air or gas flow 24 is appropriately heated by electrical resistors or any suitable heat exchangers 18 disposed in the feed pipe 15 or by the pipe 15 itself, after suitably heating it, to bring the edge of the opening 21 and possibly also the film 13 of the seal to the proper temperature.

Obviously, heating temperature must not exceed the softening points of the materials in use.

Said heating assists the adhesion of the film 13 both for a better plasticity of the contacting surfaces, and for the decreased viscosity of air or gas which form the boundary layer adjacent to the surfaces.

Typically, the process is effective because the boundary air or gas layer of the surfaces is removed as the surfaces of the film 13 and the opening 21 are driven closer thanks to the electrostatic forces. Hence, atmospheric pressure, which is no longer counterbalanced by the pressure of residual air or gases between the two surfaces, can be fully exerted, thereby creating such a force of adhesion as to create in turn a tangential, i.e. shearing friction between the two surfaces: whose coefficient of friction, which increases with the plasticity or relative "adaptability" of the two surfaces, improves when the edge 21 of the opening and the film 13 are heated.

The device for implementing this variant of the process is described below.

As an alternative to the previously described heating arrangement, the edge of the containers 21 and/or the film 13 which forms the seal are previously suitably heated by a radiant heat energy source 22.

The device for implementing this variant of the process is described below.

The gas of the flow 24 is replaced by dry steam 27 produced by any appropriate dry steam generator 25. This variant has the advantage that the edge of the container opening 21 is heated directly. In practice, the edge 21 is preferably pre-heated to a certain temperature, anyway below the material softening point by a heat source 22, to prevent any condensation of dry steam 27.

A suitable monitored system for integrating and controlling flow rate, pressure, temperature and time of exposure to flow 27 allows a drawback-free optimized use of the device. Moreover, the dry steam jet 27 will have the advantage of sterilizing the edge of the opening 21 of the container 1.

The device for implementing the above process, shown in FIG. 1b is described below.

The process consists in releasing by contact opposite electrostatic charges to the edge of the opening 1 and to the film 13 to be applied thereto.

This contact occurs before and during the step of applying the sealing film 13, whereas the charges of one sign are released by the container support 11 to the container 1 itself and the charges of the opposite sign are released by the film driving rollers 12 to the film 13. Charges are usually provided by a special generator 8, possibly including capacitors 9 and rheostats 10.

The device for implementing this variant of the process, shown in FIG. 1b is described below.

The device as shown in FIG. 1a, consists in a compressed air or gas generating system, in which compressed air or gas is generated by any suitable pump 2, equipped with a motor 3. The system includes one or more storage tanks, pipes 15 having opening and closing valves, flow control valves and one or more nozzles 5 which may be oriented relative to the opening of the container 21 to be sealed. Therefore, air or gas flow is controlled by manometers P and manostats PS, for controlling outlet pressure, hence flow rate. This air or gas flow may also be pulsating and coincide with the passage of the container edge before the nozzle/s.

The jet has the function of removing and pushing away the electrostatic charges of the container 1, or appropriate new electric charges, in such a manner that a difference of electrostatic potential is established between the container 1 and the film 13 acting as a seal.

The force exerted by the electrostatic charges will allow air or gases to be expelled from between the two surfaces, thereby allowing atmospheric pressure to exert its full force.

Figure 2:
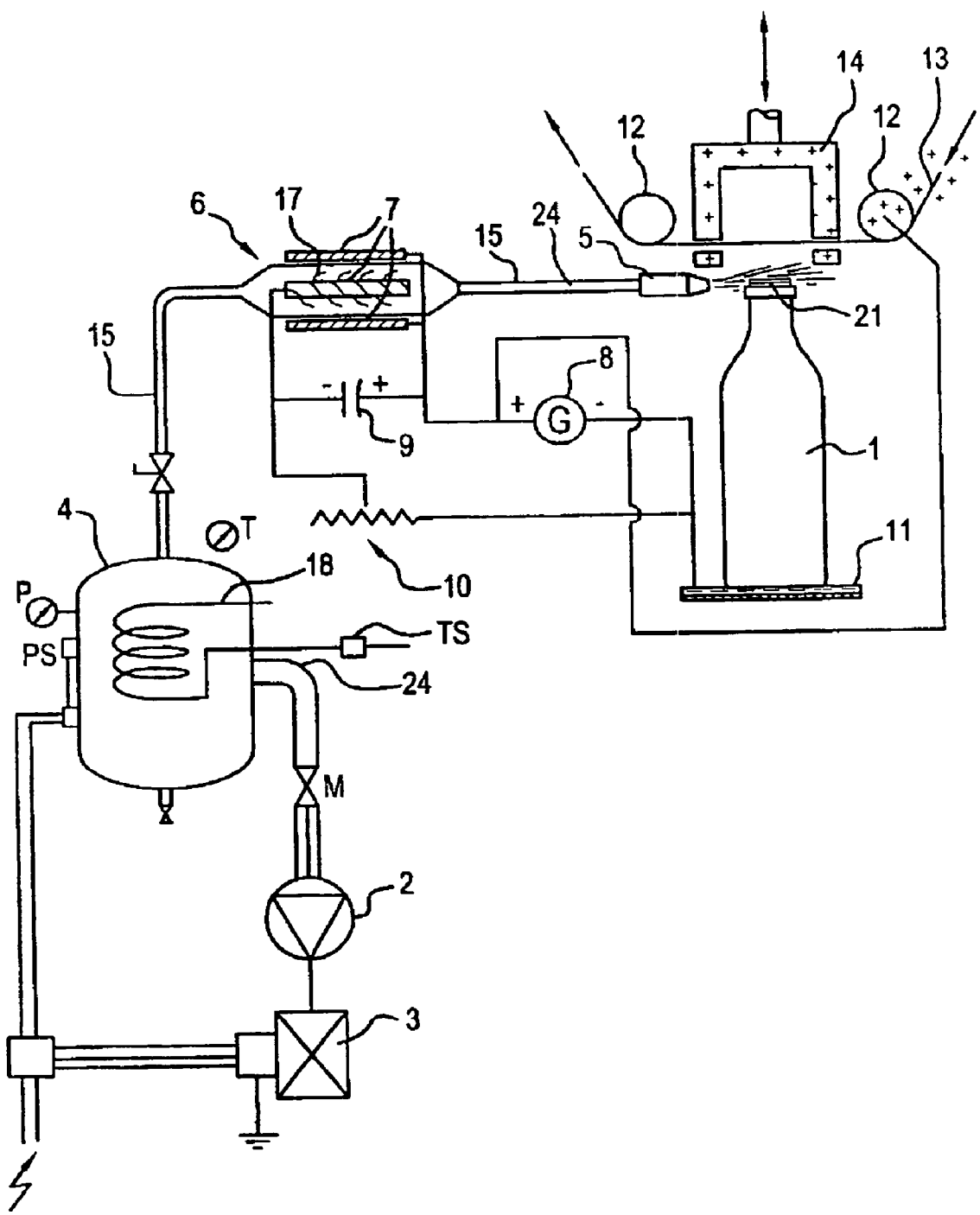
FIG. 2 shows the device of FIGS. 1a and 1b including a generator and accessories thereof.

The device as shown in FIG. 2, consists of a system including an electrostatic charge generating system. This system comprises a charge generator 8 of the "Van der Graaf" or equivalent type, one or more appropriate capacitors 9 and at least one rheostat 10.

The equal sign plates of these capacitors 9, may be either connected to appropriately insulated surfaces in contact with the air or gas flow or be themselves immersed in the gas carrying pipe 15. This sign shall be opposite to the one of the charges at the surface of the film 13.

The device as shown in FIG. 1, consists in a system which has scattering tips 17 both on the surfaces in contact with the flow in the feed pipe 15 and on the equal-sign plate/s of the capacitors 9, immersed in the flow.

These tips have the function of quickly releasing the capacitor charges to air or gas. The concentration of charges on projections of charged surfaces is a well-known physical phenomenon.

In the device shown in FIG. 2, the plates 7 of the capacitors 9 are connected to one or more additional homologous plates 7 of capacitors 9, even outside the feed pipe 15, and to one or more rheostats 10 which have the function to control the flow of electric charges to be released.

In the device shown in FIG. 2, the systems are equipped with a heating system.

This system will be preferably inserted in a special widened portion of the feed pipe 15, i.e. a muffler 4 containing one or more heaters 18 of any type, e.g. electric resistors or heat exchangers.

This system will obviously be monitored by appropriate thermostats TS and suitably insulated. An alternative to this solution consists in heating the feed pipe 15 by the same means.

The device shown in FIG. 1b, consists in a system wherein the air or gas jet is replaced by a dry steam generating system. This system consists of a dry steam generator 25, with measuring and controlling equipment as well as with an adequately insulated feed pipe 15. The control equipment consists of automated thermostats TS and manostats PS and a flow controller R. Water may be advantageously heated electrically but also by other sources of heat energy.

This device will be preferably used in association with a preheater 22 for preliminarily heating the surfaces to be blown to prevent condensation. Moreover, dry steam 27 will have the function of sterilizing the edge of the opening 21.

The device identical to the one provided for air or gas, supplements the device described above. Here, the dry steam blowing system integrates a system for generating electrostatic charges and releasing them to water molecules.

The inflow pipe 26 will have inner insulated surfaces connected to the equal-sign plates 7 of one or more capacitors, which are in turn fed by an electrostatic charge generator 8. The inner surfaces or plates 7 of the inflow pipe 26 may in turn have scattering tips 17, as in the case of air or gas.

The charge flow will be controlled as needed by an appropriate rheostat 10.

Figure 3:
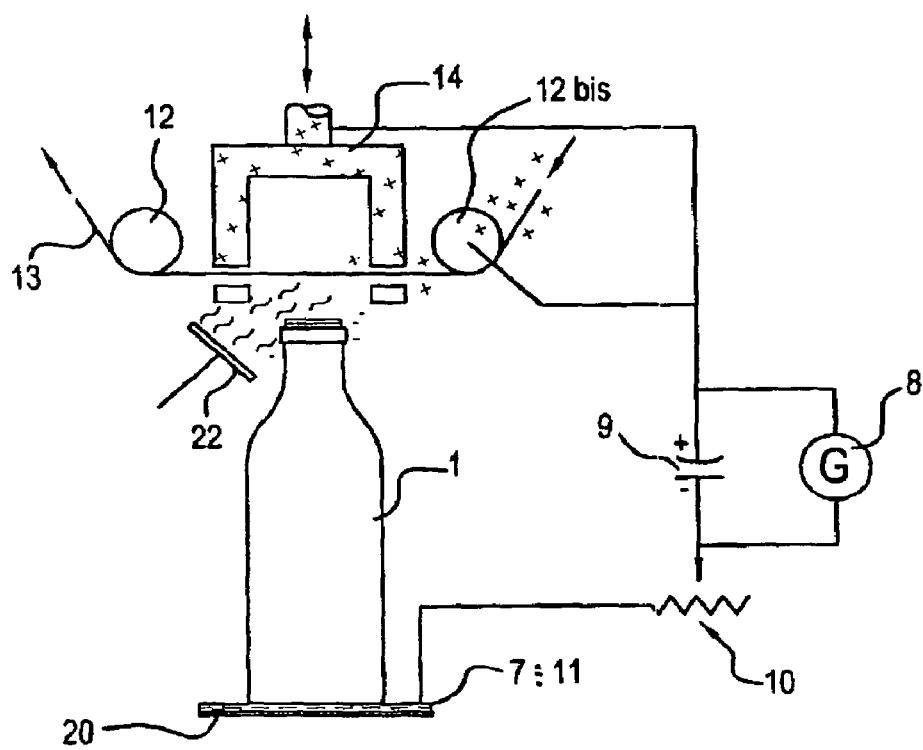
FIG. 3 shows the device with a single capacitor.

In the device shown in FIG. 3, a radiant heat source is used for any type of device as described and claimed herein. This infrared ray generating source may be either simply an electrically heated surface or any other heated mass in any other appropriate manner. Both parts, i.e. the container 1 and the film 13 will be placed in the proximity of the surfaces to be headed in such a manner that radiant heat brings the container opening 21 and the film 13 to the desired temperatures.

In the device which is not shown, a corona-type charge generator is used. An adequately insulated high voltage generator for charging suitable bodies disposed in the proximity of the edge of the opening 21 and of the film 13, will release charges of the appropriate sign to the surfaces. Then, the generator will typically consist of an electric generator, one or more high voltage transformers, appropriate control and adjustment instruments, like capacitors 9, rheostats 10, fuses and insulated wires.

Figure 4:
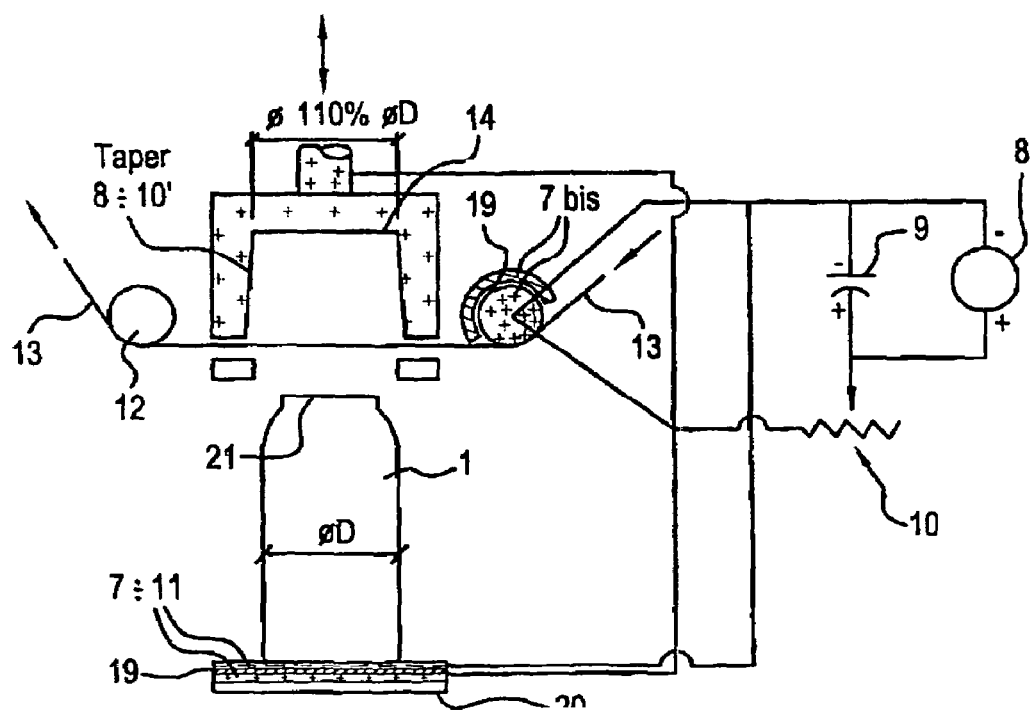
FIG. 4 shows the device applying film to a metal can.

The device shown in FIGS. 3 and 4 consists of an electrostatic charge generating system which will supply both the container 1 and the film with electrostatic charges of opposite signs. The "Van der Graaf" or equivalent generator 8, equipped with rheostats 10 and one or more capacitors, will feed, by the plates of opposite sign 7 of its capacitor/s, the support 11 of the container on the one hand and the driving rollers 12 for the film band 13. Hence, the opposite sign charges will cause the film 13 and the edge of the container opening 21 to adhere against each other and will expel the residual air or gas between the two surfaces.

LIST AND KEY OF FIGURES

FIG. 1a

Shows the device in its simplest configuration for implementing the process as claimed and comprises the following:
1. Plastic or metal container to be sealed.
2. Gas pump (for air or other suitable gas).
3. Motor.
4. Storage tank.
5. Nozzle.
11. Container support (possibly movable, e.g. conveyor belt).
12. Roller for driving the extensible polymer film (possibly armor-plated).
13. Extensible polymer film (possibly armor-plated).
14. Device for applying the extensible polymer film (as per Patent application WO 98/32668 of Jan. 23, 1998).
15. Gas pipe.
21. Opening edge.
P. Manometer.
S. Condensation drain.
M. Flow control.
PS. Manostat
  FIG. 1b
24. Gas flow pipe.
25. Dry steam generator.
26. Insulated pipe.
27. Dry steam jet.
TS. Thermostat.
R. Flow control.
M. Additional flow control.
  FIG. 2
Shows the device in the configuration that includes a generator and accessories thereof for implementing the process as claimed and comprises the following:
1. Plastic or metal container.
2. Gas (air) pump.
3. Motor.
4. Storage tank.
5. Nozzle.
6. Muffler containing capacitor plates immersed in the air flow.
7. Plates of the internal capacitor.
8. Generator.
9. External parallel capacitor.
10. Rheostat.
11. Insulated support.
12. Film driving roller.
13. Polymer film.
14. "RIBI" film application device.
15. Gas pipe.
16. Manostat electric contactor.
17. Scattering tips.
18. Heater.
21. Opening edge.
24. Gas flow pipe.
P. Manometer.
T. Thermometer.
TS. Thermostat.
M. Flow control.
PS. Manostat.
  FIG. 3
Shows the device with a single capacitor 9 for implementing the process as claimed and comprises the following:
1. Plastic (or metal) container.
7/11. Container support.
8. Generator.
9. Capacitor.
10. Rheostat.
7/11. Container support (and plate).
12. Film driving guide roller.
12bis. Film driving guide roller (and plate having a charge opposite to the container support).
13. Extensible polymer film.
14. "RIBI" film application device.
20. Insulator.
21. Opening edge.
  FIG. 4
Shows a device for applying the film 13 to a metal can 1, wherein both the film driving roller/s 12 or 12bis and the container support are themselves capacitor plates, and consist of at least two plates, having a dielectric 19 interposed therebetween, and whose charges, of opposite sign, are released to the film 13 and to the container 1. The drawing comprises the following:
1. Container.
8. Generator.
9. Capacitor.
10. Rheostat.
7./11. Support-plates.
12. Driving roller.
12bis. Electrostatically charged driving roller.
13. Film.
14. "RIBI" film application device.
19. Dielectric.
20. Insulator.
21. Opening edge.

The invention claimed is:

1. A device for applying an extensible film onto an edge of an opening of a container comprising at least one compressed gas source, gas supply from the gas source, one or more pipes for gas flow, and one or more suitably oriented nozzles for blowing the gas between the edge of the opening and a surface of the film facing the edge, further comprising a capacitor of two or more plates disposed in the one or more gas pipes or being in contact therewith, and insulation for electrically insulating the capacitor from the device.

2. The device of claim 1, wherein one or more of the plates comprise electrostatic charge.

3. The device of claim 2, wherein one or more of the plates comprise one or more tips disposed in the gas pipe.

4. The device of claim 3, wherein the tips are oriented in a flow direction.

5. The device of claim 3, wherein the tips are covered with noble metal.

6. The device of claim 2, wherein the plates are connected to one or more plates of an additional electric capacitor.

7. The device of claim 6, wherein the plates are connected to electric resistors or rheostats.

8. The device of claim 1, further comprising one or more heating bodies disposed in a tank for feeding gas coupled to the one or more gas pipe.

9. The device of claim 8, wherein the one or more heating bodies is controlled by one or more thermostats.

10. The device of claim 1, further comprising at least one suitable steam generator, at least one suitably heat-insulated pipe, one or more adjustable nozzles for blowing the gas.

11. The device of claim 10, wherein the one or more nozzles further comprise suitable opening and closing valves.

12. The device of claim 11, wherein the nozzles further comprises one or more flow control valves.

13. The device of claim 10, further comprising one or more thermostats.

14. The device of claim 10, wherein the steam generator is a dry steam generator.

15. A device for applying an extensible film onto an edge of an opening of a container comprising at least one compressed gas source, gas supply from the gas source, one or more pipes for gas flow, and one or more suitably oriented nozzles for blowing the gas between the edge of the opening and a surface of the film facing the edge, further comprising a capacitor having one or more electrically chargeable plates disposed in or around the pipe.

16. The device of claim 15, further comprising one or more additional electric capacitors.

17. The device of claim 16, further comprising electric resistors or rheostats.

18. The device of claim 15, wherein the plates comprise one or more tips disposed in or around the pipe.

19. The device of claim 15, further comprising one or more suitable radiant heat sources disposed at or near the edge of the opening.

20. The device of claim 19, wherein the heat sources are disposed proximal the extensible film.

21. A device for applying an extensible film onto an edge of an opening of a container comprising at least one compressed gas source, gas supply from the gas source, one or more pipes for gas flow, and one or more suitably oriented nozzles for blowing the gas between the edge of the opening and a surface of the film facing the edge, further comprising one or more suitable radiant heat sources disposed at or near the edge of the opening to be sealed, wherein the heat sources are disposed proximal the extensible film, further comprising a charger for releasing electric charges to the edge of the opening to be sealed and/or to the extensible film by corona discharge.

22. The device of claim 21, wherein the charger comprises one or more suitable insulated conductors at high electromotive voltage appropriately positioned by the edge of the opening to be sealed and/or the extensible film to be applied.

23. The device of claim 21, wherein the container is selected from the group consisting of plastic, polymer, metal containers, and combinations thereof.

24. The device of claim 21, wherein the film is a polymer film.

25. The device of claim 21, wherein the container is a bottle.

* * * * *